United States Patent
Kao et al.

(10) Patent No.: US 7,357,523 B2
(45) Date of Patent: Apr. 15, 2008

(54) ILLUMINATING KEYBOARDS

(75) Inventors: Ko-Chia Kao, Jiouru Township, Pingtung County (TW); Chih-Kuang Chen, Kaohsiung (TW); Hui-Kai Chou, Taipei (TW)

(73) Assignee: AU Optronics Corp., Hsinchu (TW)

( * ) Notice: Subject to any disclaimer, the term of this patent is extended or adjusted under 35 U.S.C. 154(b) by 82 days.

(21) Appl. No.: 11/062,499

(22) Filed: Feb. 22, 2005

(65) Prior Publication Data

US 2006/0139905 A1 Jun. 29, 2006

(30) Foreign Application Priority Data

Dec. 23, 2004 (TW) .............................. 93140226 A

(51) Int. Cl.
*G01D 11/28* (2006.01)
(52) U.S. Cl. .......................... 362/23; 362/24; 362/26; 362/558
(58) Field of Classification Search ................. 362/23, 362/24, 26, 558, 30; 345/170, 168
See application file for complete search history.

(56) References Cited

U.S. PATENT DOCUMENTS

| 4,173,143 A | * | 11/1979 | Venton-Walters | ........ 73/861.22 |
| 5,867,772 A | * | 2/1999 | Jonsson et al. | ........... 455/575.1 |
| 6,249,368 B1 | * | 6/2001 | Hsu | ........................... 359/212 |
| 2003/0103359 A1 | * | 6/2003 | Chiang et al. | .............. 362/558 |
| 2004/0130770 A1 | * | 7/2004 | Nguyen et al. | ............. 359/241 |

FOREIGN PATENT DOCUMENTS

CN 1432892 A 7/2003

* cited by examiner

*Primary Examiner*—Sandra O'Shea
*Assistant Examiner*—Mark Tsidulko
(74) *Attorney, Agent, or Firm*—Thomas, Kayden, Horstemeyer & Risley

(57) ABSTRACT

An illuminating keyboard is provided. An illuminating keyboard includes a key module, a light guide plate, and a light source. The key module includes one or more keys. The light guide plate is disposed beneath the key module and includes a plurality of openings. The plurality of openings is formed outside any area directly beneath the one or more keys. The light source is disposed adjacent to the light guide plate.

20 Claims, 4 Drawing Sheets

ILLUMINATING KEYBOARDS

BACKGROUND

The invention relates to illuminating keyboards.

Keyboards are input devices commonly used in many electronic devices, such as personal computers, cellular phones, and remote controllers. These electronic devices can be used in various settings, for example, in a room with weak lighting. Illuminating keyboards are thus provided for such cases.

Generally, in a conventional illuminating keyboard, a light source and a light guide plate are employed to provide light to keys of the illuminating keyboard. Typically, the light guide plate is a translucent plate. By reflective dots, the light from the light source is distributed evenly in the light guide plate to illuminate the keys of the illuminating keyboard.

Modern electronic devices trend toward the compact and slim. Thus, power efficiency has become an important task. The design of the conventional illuminating keyboard needs to be improved to increase power efficiency and eliminating power waste.

SUMMARY

An illuminating keyboard is provided. An exemplary embodiment of an illuminating keyboard comprises a key module, a light guide plate, and a light source. The key module comprises one or more keys. The light guide plate is disposed beneath the key module and comprises a plurality of openings. The openings are formed outside any area directly beneath the one or more keys. The light source is adjacent to the light guide plate.

DESCRIPTION OF THE DRAWINGS

Illuminating keyboards can be more fully understood by reading the subsequent detailed description and examples with references made to the accompanying drawings, wherein.

DETAILED DESCRIPTION

Illuminating keyboards will be described in greater detail in the following.

A principle aim of the invention is to form an opening in an area of a light guide plate unrelated to any key of an illuminating keyboard. The inner surfaces of the opening are covered with a light reflecting material. Thus, areas where light travels are decreased, thereby increasing light efficiency.

Figure 1:
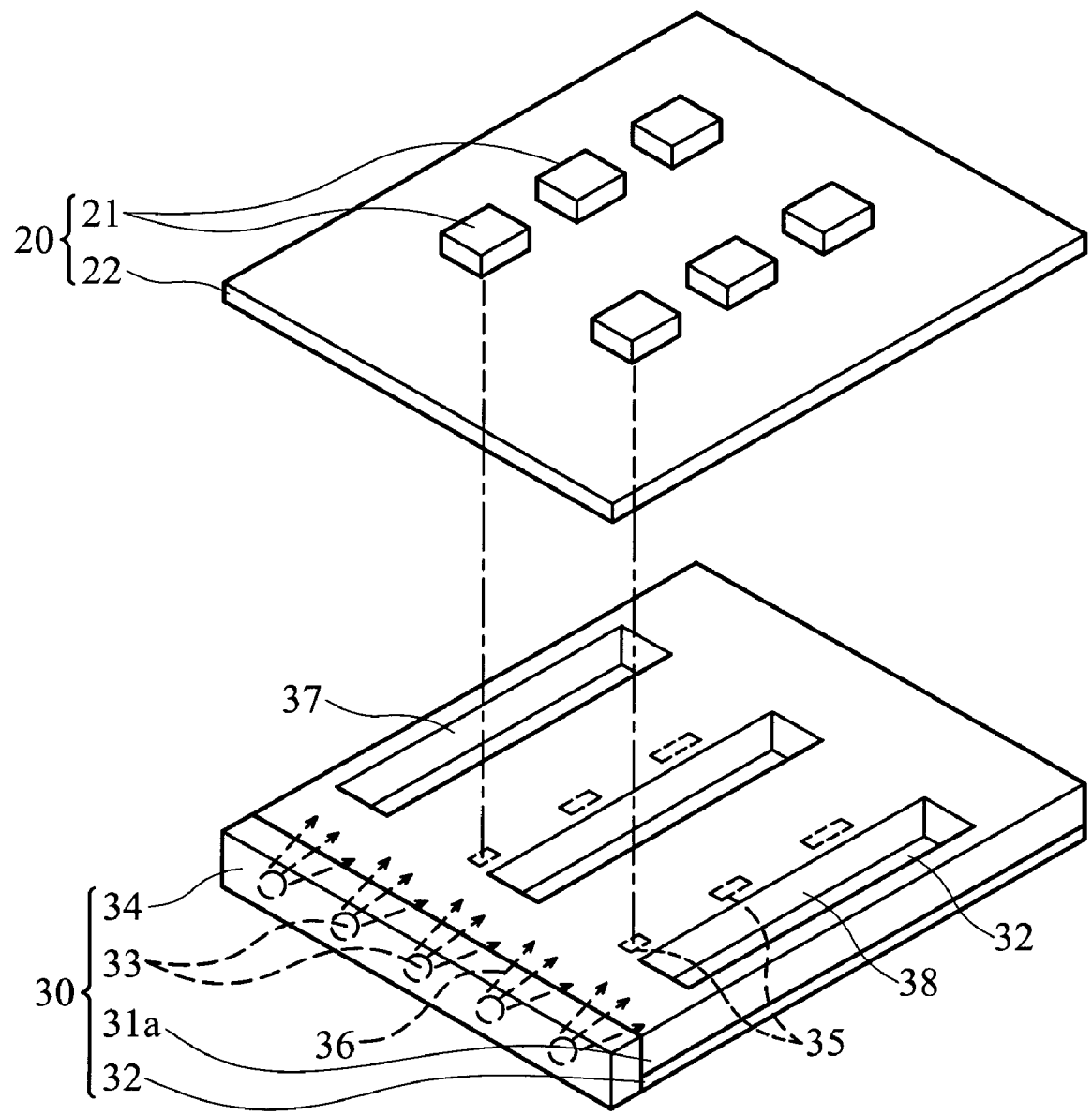
FIG. 1 is an exploded view of an embodiment of an illuminating keyboard.

FIG. 1 is an exploded view of an embodiment of an illuminating keyboard 10. As shown in FIG. 1, the illuminating keyboard 10 comprises a key module 20 and a backlight module 30. The key module 20 comprises a plurality of keys 21 and a bottom plate 22. The keys, disposed on the bottom plate 22, are upwardly and downwardly movable. The backlight module 30 is disposed beneath the key module 20. The backlight module 30 comprises a light guide plate 31a, a reflecting plate 32, a light source 33, and a shelter 34. The light source 33 is an LED (Light Emitting Diode) adjacent to the light guide plate 31a. The shelter 34 covers one side of the light source 33, directing a light beam 36 emitted from the light source 33 to enter the light guide plate 31a without light loss. The light beam 36 exits from the top of the light guide plate 31a. Thus, the light source 33 provides a bottom-up light beam 36 to the key module 20.

Furthermore, the lower surface of the light guide plate 31a comprises a plurality of light reflecting portions 35 corresponding to the keys 21 one-to-one. Each light reflecting portion 35 comprises a plurality of reflective dots. The reflective dots are printed on the lower surface of the light guide plate 31a. Thus, the light beam 36 emitted from the light source 33 to the light guide plate 31a can be focused on and reflected to the keys 21 by the reflective dots of the light reflecting portions 35.

Moreover, the light reflecting portions 35 comprise fewer reflective dots near the light source 33 and more reflective dots farther from the light source 33, thereby each key 21 of the illuminating keyboard 10 receives approximately the same brightness. Moreover, the reflecting plate 32 is disposed beneath the light guide plate 31a. The light beam 36 exiting from bottom of the light guide plate 31a is reflected back to the light guide plate 31a by the reflecting plate 32, thus increasing light efficiency of the light beam 36.

Furthermore, the light guide plate 31a comprises a plurality of openings 37 such as longitudinal slits formed on an upper surface of the light guide plate 31a facing the key module 20, as shown in FIG. 1. The openings 37 are located outside any area directly beneath the keys 21 and independent of the light reflecting portions 35. Each opening 37 passes through the light guide plate 31a. Inner surfaces of the openings 37 are covered with light reflecting layers 38, thus preventing the light beam 36 from entering the openings 37. The light reflecting layers 38 include polyethylene terephthalate (PET) or barium sulfide (BaS), electroplated or adhesively disposed on the inner surfaces of the openings 37.

Figure 2:
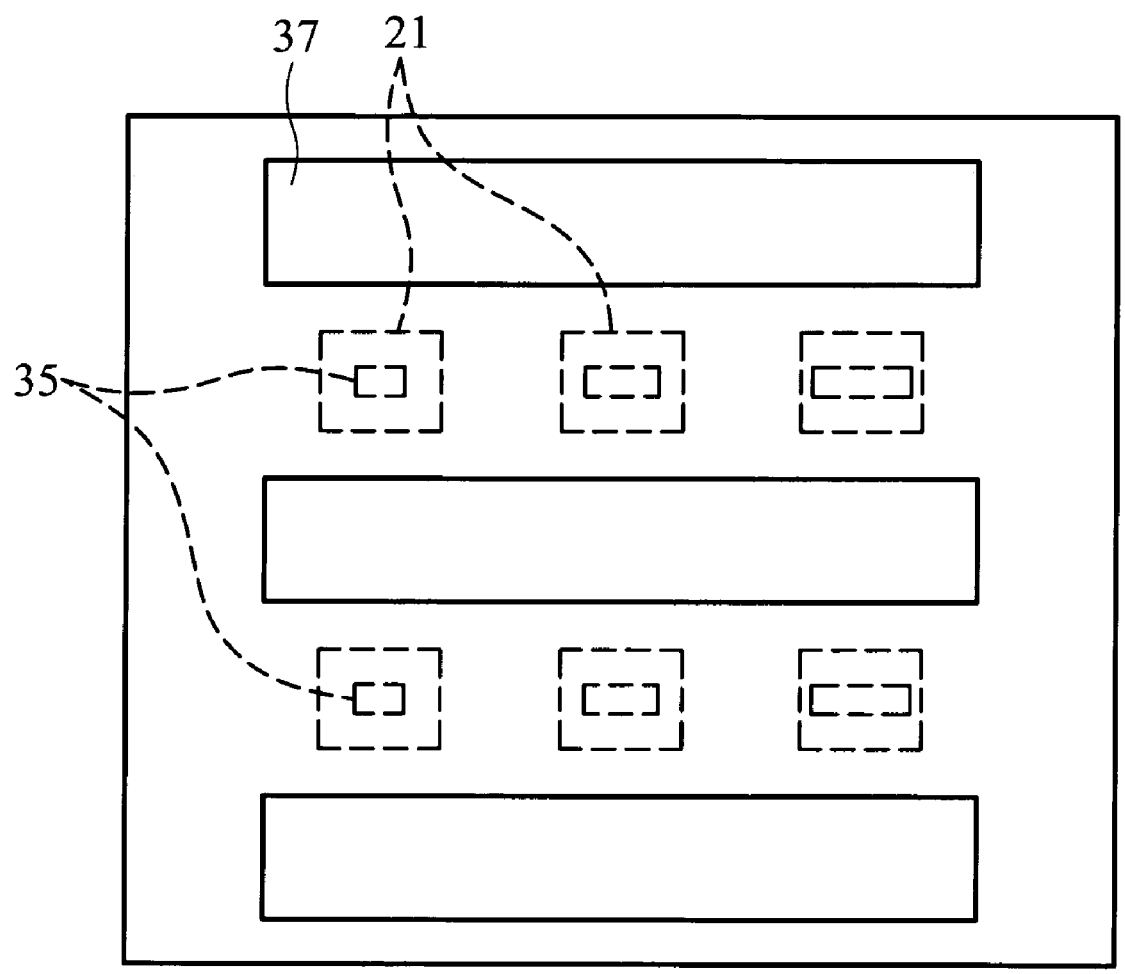
FIG. 2 is a top view of an embodiment of a light guide plate.

FIG. 2 is a top view of an embodiment of the light guide plate 31a. It can be clearly seen that the openings 37 are located outside any area directly beneath the keys 21 and independent of the light reflecting portions 35.

Figure 3:
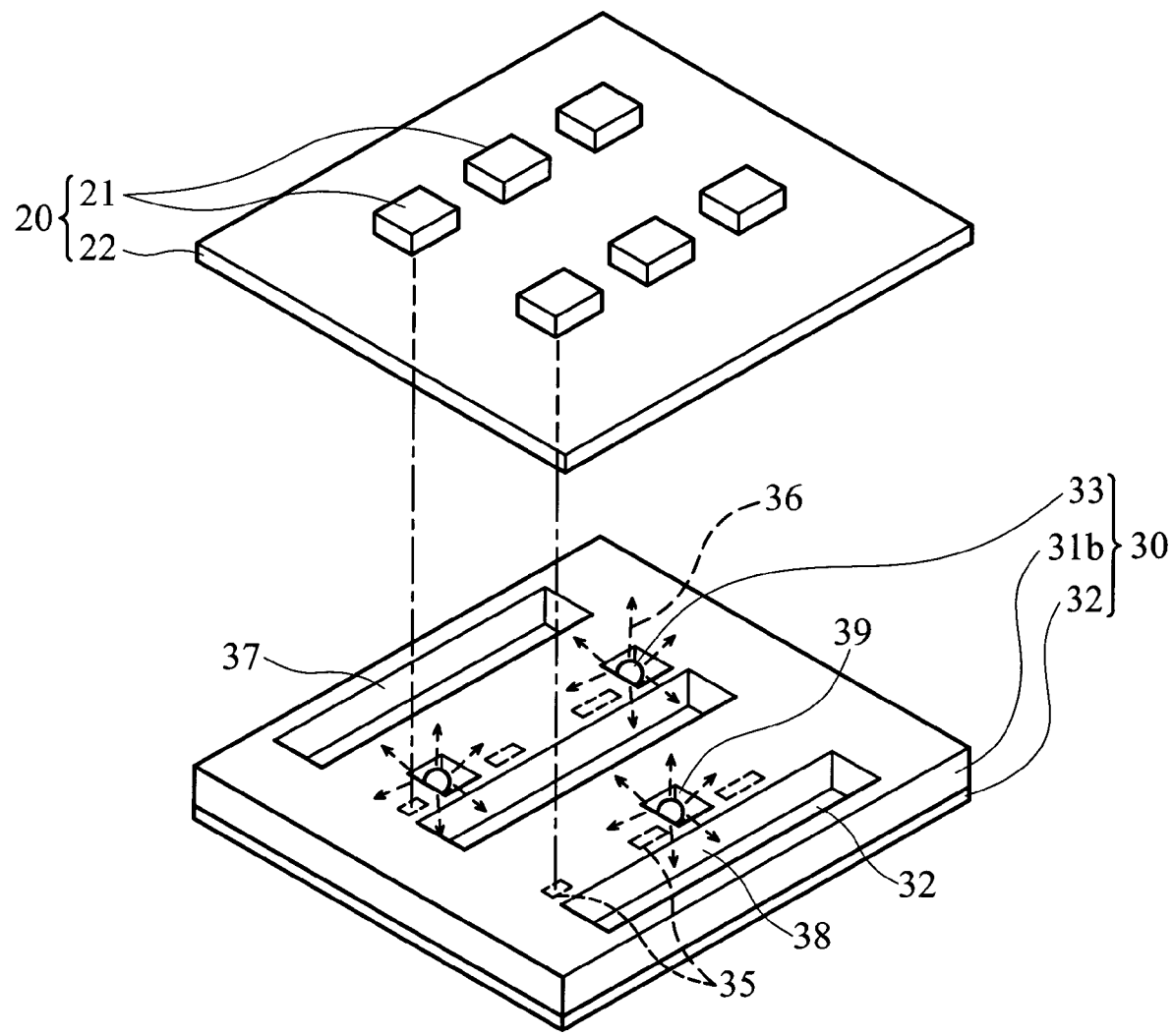
FIG. 3 is an exploded view of another embodiment of an illuminating keyboard.
Figure 4:
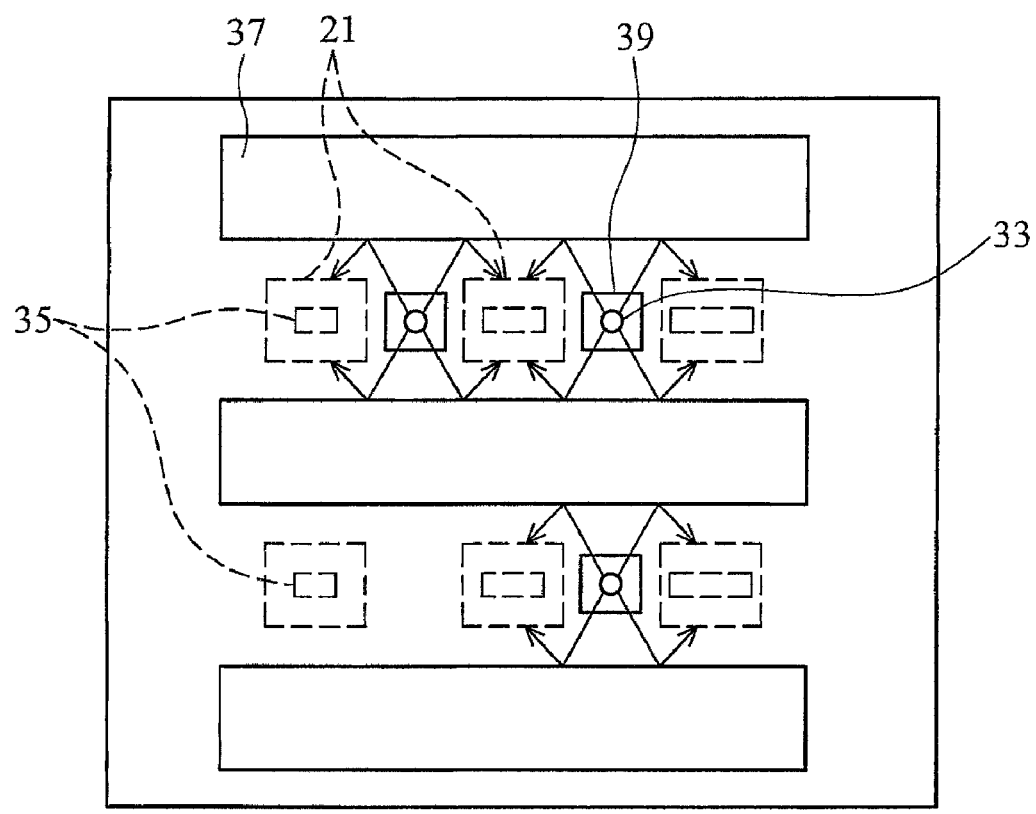
FIG. 4 is a top view of another embodiment of a light guide plate.

FIG. 3 is an exploded view of another embodiment of the illuminating keyboard 10. FIG. 4 is a top view of another embodiment of a light guide plate 31b. The difference between the two embodiments is that the light guide plate 31b further comprises a plurality of through holes 39. The through holes 39 can accommodate the light source 33. Moreover, the shelter 34 in the previous embodiment can be omitted herein. Descriptions of other components can be found in the previously described embodiments and are thus omitted herein for simplicity.

In some embodiments of an illuminating keyboard, an opening is provided in an area of the light guide plate unrelated to any key of the illuminating keyboard. The inner surfaces of the opening are covered with a light reflecting material. Thus, light from a light source only travels to required areas, i.e. areas corresponding to keys, thereby the size of travel areas is decreased, light efficiency is increased, and power waste due to multiple reflective numbers is eliminated.

While the invention has been described by way of example and in terms of several embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An illuminating keyboard, comprising:
   a key module having one or more keys;
   a light guide plate, disposed beneath the key module, having an upper surface facing the key module and a plurality of openings formed on the upper surface, wherein the plurality of openings are formed outside any area directly beneath the one or more keys, and the plurality of openings are formed in an inner area of the upper surface, such that the openings are separated by a distance from a peripheral edge of the upper surface;
   a plurality of light reflecting layers respectively formed on the inner surfaces of the openings; and
   a light source disposed adjacent to the light guide plate.

2. The illuminating keyboard of claim 1, wherein the light reflecting layers are electroplated on the inner surfaces of the plurality of openings.

3. The illuminating keyboard of claim 1, wherein the light reflecting layers are adhesively disposed on the inner surfaces of the plurality of openings.

4. The illuminating keyboard of claim 1, wherein the light reflecting layers comprise polyethylene terephthalate (PET).

5. The illuminating keyboard of claim 1, wherein the light reflecting layers comprise barium sulfide (BaS).

6. The illuminating keyboard of claim 1, wherein the lower surface of the light guide plate comprises a plurality of reflective dots corresponding to the one or more keys.

7. The illuminating keyboard of claim 1, wherein the key module comprises a bottom plate, and the one or more keys are disposed on the bottom plate.

8. The illuminating keyboard of claim 1, further comprising a reflecting plate disposed beneath the light guide plate.

9. The illuminating keyboard of claim 1, wherein the light source comprises a light emitting diode (LED).

10. The illuminating keyboard of claim 1, wherein the light guide plate further comprises a through hole for accommodating the light source.

11. The illuminating keyboard of claim 1, wherein the light source comprises a light emitting diode (LED).

12. An illuminating keyboard, comprising:
    a key module having one or more keys;
    a light guide plate, disposed beneath the key module, having an upper surface facing the key module and a plurality of slits formed on the upper surface, wherein the plurality of slits are formed outside any area directly beneath the one or more keys, and the plurality of slits are formed in an inner area of the upper surface, such that the slits are separated by a distance from a peripheral edge of the upper surface;
    a plurality of light reflecting layers respectively formed on the inner surfaces of the slits; and
    a light source disposed adjacent to the light guide plate.

13. The illuminating keyboard of claim 12, wherein the light reflecting layers are electroplated on the inner surfaces of the plurality of slits.

14. The illuminating keyboard of claim 12, wherein the light reflecting layers are adhesively disposed on the inner surfaces of the plurality of slits.

15. The illuminating keyboard of claim 12, wherein the light reflecting layers comprises polyethylene terephthalate (PET).

16. The illuminating keyboard of claim 12, wherein the light reflecting layers comprise barium sulfide (BaS).

17. The illuminating keyboard of claim 12, wherein the lower surface of the light guide plate comprises a plurality of reflective dots corresponding to the one or more keys.

18. The illuminating keyboard of claim 12, wherein the key module comprises a bottom plate, and the one or more keys are disposed on the bottom plate.

19. The illuminating keyboard of claim 12, further comprising a reflecting plate disposed beneath the light guide plate.

20. The illuminating keyboard of claim 12, wherein the light guide plate further comprises a through hole for accommodating the light source.

* * * * *